Oct. 12, 1965   M. A. CLIFT ETAL   3,211,167
APPARATUS FOR TRANSPORTING SEWAGE AND WASTE LIQUIDS
Filed July 19, 1962   2 Sheets-Sheet 1

INVENTOR.
MORTIMER A. CLIFT and
BY CLARENCE L. SNYDER

*Lockwood, Woodard, Smith & Weikart*
Attorneys

INVENTOR.
MORTIMER A. CLIFT and
BY CLARENCE L. SNYDER
Attorneys

3,211,167
APPARATUS FOR TRANSPORTING SEWAGE AND WASTE LIQUIDS
Mortimer A. Clift, R.R. 12, Box 235D, Indianapolis, Ind., and Clarence L. Snyder, Hillsboro, Ind.; James F. Snyder and E. Genevia Hicks, administrators of said Clarence L. Snyder, deceased
Filed July 19, 1962, Ser. No. 210,893
5 Claims. (Cl. 137—236)

The present invention relates to an improved apparatus for the transportation of sewage and waste liquids.

Sewage is the liquid waste of a community and is composed of liquids containing dissolved, suspended and floating solids discharged from toilets, baths, sinks, household appliances and other plumbing fixtures in residences, institutions, business and public buildings and from manufacturing or industrial plants and processes, service establishments and the like. While sewage and waste liquids commonly contain small quantities of solid matter, compared with the total quantity of liquid or water in which they are entrained, such solid matter is generally of a highly putrescible nature, sufficient to create a health hazard, unless than entire sewage flow is promptly and effectively conveyed away from the community to a suitable location for treatment, or dispersion.

By the conventional method, sewage and waste liquids are admitted at their points of origin, into a system of sewers or conduits, in which they are thereafter contained and through which they flow, by gravity, to the point of final discharge. Such a system, including house connections, laterals, branch and main sewers, trunk sewers, interceptor and outfall sewers and appurtenances, is commonly called a sewerage system.

The flow of liquid through a conventional sewerage system is maintained by the force of gravity and the design of such systems is fundamentally influenced by natural topography. Routing and sizing of sewers are dictated by the need to obtain maximum slope or rate-of-descent and maximum capacity from sewers of given sizes, commensurate with practical depth below street and ground surfaces. On the other hand the conventional gravity sewerage system necessitates the use of relatively large piping and conduit to handle the necessary liquid volume at the low gradients (rate-of-descent) generally available. In many locations where the natural ground surface is flat, or only gently sloping, the depth at which sewers must be laid increases progressively towards the outfall end of the system in order to maintain certain minimum gradients throughout. The cost of laying sewer pipe is great because of the large size of the sewer pipe. The cost of laying sewer of any given size increases sharply with every foot of depth below ground, or street level. Such cost increase is multiplied whenever, as is frequently the case, water, rock or unstable ground conditions are encountered. The necessity for pumping or other dewatering procedures, blasting, tunneling, shoring, pipe encasement and like expedients, coupled with the need for more extensive excavation and backfill and the handling of greater quantities of material tend to increase installation costs out of all proportion to the sewer capacity obtained.

Because of the relatively large pipe sizes required in a conventional sewerage system, it becomes economically infeasible to utilize cast iron, or other metallic pipe, except in locations where increased tensile strength is mandatory. For economic reasons, virtually all sewer pipe is of vitrified clay, concrete, or similar ceramic material. While adequate in most respects for sewer service, the low tensile strength of these materials prohibits the manufacture of conventional sewer pipe in long lengths. Thus, a conventional sewer system is generally laid with a multiplicity of joints between short lengths of pipe, each of which is a cost item to install and is a point where roots may insinuate themselves into the sewer, where weakness may occur, or where ground water may infiltrate the system.

Since the growth of roots, deposits of silt and other obstructions in sewers are inescapable, it is common practice to require the installation of manholes at frequent intervals to permit inspection and the insertion of sewer cleaning devices. The provision of manholes is a substantial cost factor in sewer construction and many manholes in remote locations are potential apertures for the introduction of undesirable foreign matter into the sewer.

For the above and other reasons, the cost of conventional sewer construction and maintenance is now at such a level that several thousands of smaller communities are unable to finance necessary sewerage systems. Many such communities are presently limited to septic tanks, where not uncommonly soil characteristics are unsuitable and pollution of the water supply is potentially hazardous. Others are partly sewered but require improvements and additional sewerage. A large number require sewerage and sewage treatment facilities in order to implement the national stream pollution abatement program. A growing number of suburban communities urgently require adequate sewerage in order to collect and deliver their liquid wastes into the sewerage system of neighboring cities for subsequent treatment. In many cases, necessary environmental improvements and health measures must be abandoned because of inability to provide adequate financing for sewer construction by conventional methods.

Consequently, a primary object of the present invention is to provide an improved sewerage system for transporting and disposal of sewage.

More particularly, objects of the present invention are to provide apparatus for transporting of sewage which permits the use of conduits of substantially less diameter and of longer length, to provide apparatus for transporting of sewage which requires no manholes or in which the number of manholes can be reduced, to provide apparatus for transporting of sewage which does not require laying of pipe at great depths, to provide apparatus for transporting of sewage permitting the use of stronger more durable pipe without increase in cost, to provide apparatus for transporting of sewage which better resists the insinuation of root systems into the sewer, to provide apparatus for transporting of sewage which better resists the infiltration of ground water into the sewer and which better resists the leakage of sewage from the sewer at undesired points, and to provide apparatus for transporting of sewage which substantially reduces the cost of constructing a sewerage system.

Further objects and advantages will appear as the description proceeds.

The invention comprehends novel apparatus for transporting sewage and waste liquids, from their points of origin to points of treatment or dispersion, under pressure.

One illustrative embodiment of the apparatus of the present invention comprises a sewage source, a sewage treatment plant, a pipeline leading from the sewage source to the plant and means for pumping the sewage from the source under pressure through the pipeline to the plant, substantially all horizontal movement of the sewage through the pipeline being under pressure whereby the dependency upon gravity to move the sewage is eliminated.

The full nature of the invention will be understood from the accompanying drawings and the following description and claims.

Figure 1:
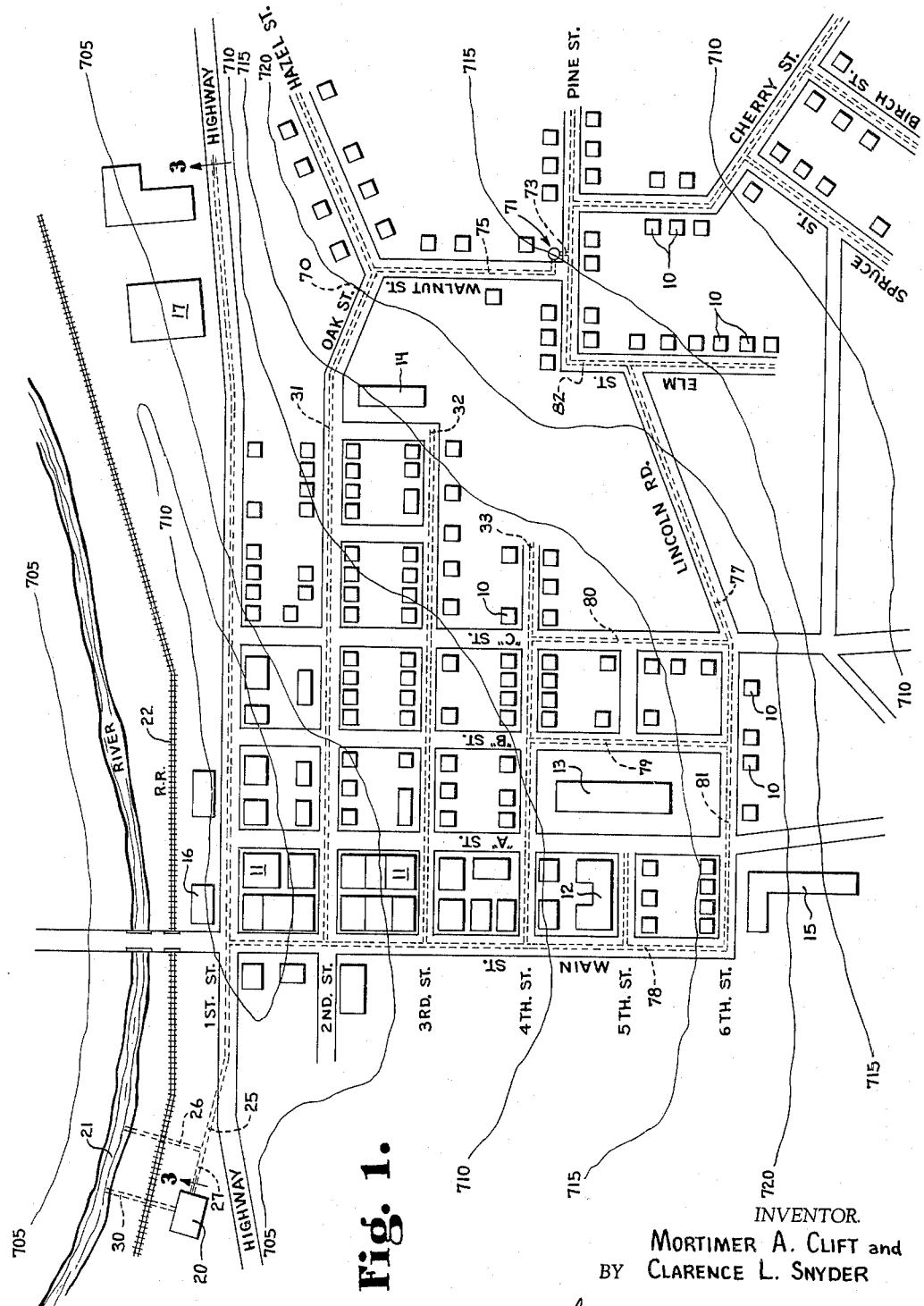
FIG. 1 is a plan of a community disposed system constructed according to the present invention.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated in FIG. 1 a sample community including a plurality of houses 10, a number of business buildings 11, public buildings 12, school 13, a shopping center 14, a motel 15, a railroad depot 16, a factory 17 and various other business buildings and the like which will not be mentioned. The various streets of the community have been designated on the drawing for clarity as have been contour lines showing elevations varying from 705 feet to 720 feet. A sewage treatment plant 20 is located adjacent a river 21 which flows generally parallel with the railroad 22. The sewage flowing toward plant 20 through the pipeline 25 may be discharged into the river directly through the pipeline 26 or may be delivered directly to the plant through the pipeline 27 for processing and later flow into the river 21 through the pipeline 30.

Figures 5A, 5B:
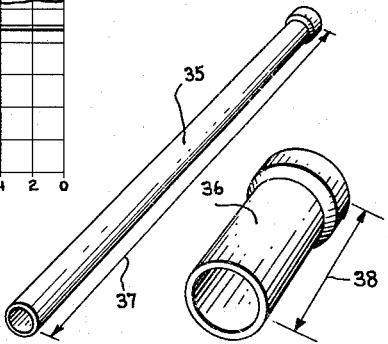
FIG. 5A and FIG. 5B are perspective views of two lengths of pipe comparing relative sizes of pipe used in the present invention and pipe used in conventional sewerage systems, respectively.

Referring to FIGS. 5A and 5B which show respectively a section of pipe from the present invention and a section of conventional sewer pipe, it will be appreciated that the pipe sections such as 35 are substantially longer and of lesser diameter than the pipe section 36 of a conventional sewerage system. Rather than give a specific size for the pipe section 35, it should be understood that the diameter will be determined by the capacity necessary for the pipe section and will be designed according to recognized hydraulic principles. Generally speaking, the pipe size will be selected so as to maintain a relatively constant friction loss throughout the sewerage system. Considered from another direction, the pipe size will be such as to make necessary flow of sewage through the pipe at a speed approximately 2½ feet per second which speed has been found to keep the solid matter in the sewage in suspension but does not increase the friction loss above an undesirable value. It should be understood, of course, that the present invention includes flow at other speeds other than 2½ feet per second and that this is merely a preferred value.

The length 37 of the pipe section 35 is substantially greater than the length 38 of the conventional pipe section 36 and may be, for example, 10 feet or greater. The pipe section 35 is composed of metallic or non-metallic material whereas the conventional pipe section 36 is usually composed of vitrified clay, concrete or other such ceramic material.

Figure 3:
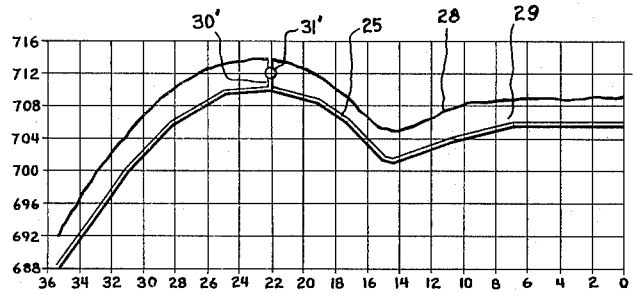
FIG. 3 is a vertical section or profile view taken along the line 3—3 of FIG. 1 and showing the elevational arrangement of the pipeline, the major portion of which runs along 1st St. of FIG. 1.

Referring to FIG. 3, the pipeline 25 extending along 1st Street is shown to be buried beneath the upper surface 28 of the ground 29 at approximately constant distance. Thus, the slope or gradient of the pipeline 25 does not depend upon insuring that gravity causes flow in one direction but instead depends upon the convenience of installation of the pipeline. Thus, the pipeline is buried perhaps 4 feet beneath the ground to insure that the contents thereof will not be frozen in extremely cold weather. At the uppermost elevation of the pipeline 25, there is provided an air release duct 30' and valve 31' which permits tapping off air from the pipeline to prevent air locking of the pipeline. It should be understood that the inside and contents of the pipeline 25 as well as all of the pipelines of the present invention are under pressure. For example, the pressure within the pipeline 25 might be equal to a head of approximately 20 feet of water at the highest elevation (710 feet) of the pipeline. Such pressure produces rapid flow of the sewage within the system at a speed which might be, for example, equal to the above mentioned 2½ feet per second.

Figure 2:
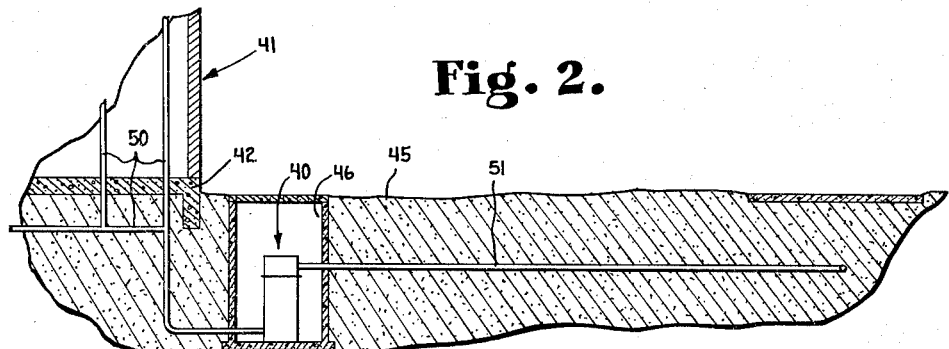
FIG. 2 is a vertical section taken through the ground adjacent a house and partially including the house and showing a sewage pumping arrangement, all of the structure of FIG. 2 forming a portion of the structure illustrated in FIG. 1.

Referring to FIG. 2, the pressure in the pipeline 25 as well as in the pipelines 31, 32, 33 and other pipelines in the system is produced by devices such as the device 40. FIG. 2 shows a house 41 which is built on a slab 42 so that the pumping device 40 must be located outside of the house in the ground 45 and within a vault 46. The pumping device 40 is conventional and may be, for example, a Smith and Loveless Uniject model Pneumatic Sewage Ejector manufactured by Smith and Loveless, Inc. of Kansas City, Missouri. The device 40 is a displacement type of pump. Thus, the sewage flows to the device 40 by gravity through the piping 50 in the house and when a predetermined amount or level of sewage has been accumulated in the device 40, it is pumped into the piping 51 which leads away from the house and is connected to one of the pipelines such as 25, 31, 32, etc. Thus, the devices 40 provide the pressure in the pipelines. The device 40 incorporates check valves which prevent any of the sewage in the line 51 from being force back into the house sewage system or pipes 50.

Each of the dwellings 10, as well as the other various buildings 11–17, is provided with a device similar to the device 40 which is connected to one of the pipelines and which makes possible the maintenance of the desired pressure within the pipeline system.

Figure 6:
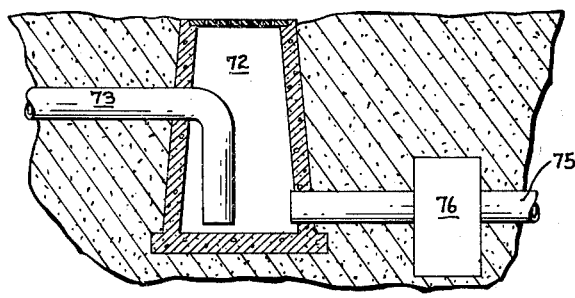
FIG. 6 is a vertical section of a conventional lift station forming a part of the structure illustrated in FIG. 1.

It can be understood that because of the fact that certain portions of the pipeline system are elevated, it may be impossible for the various devices 40 to create sufficient pressure on the sewage to pump it over such elevations. For example, there is a point on Oak Street and adjacent the intersection of Oak Street with Walnut Street at which the elevation of the ground (and also the pipeline) is 720 feet. The devices 40 associated with the houses along Birch, Cherry and Spruce Sts. do not have sufficient pumping capacity to raise the sewage to sufficient pressure to overcome the total dynamic head attained at the point 70 on Oak Street. Consequently, a conventional lift station 71 is provided adjacent the intersection of Walnut and Pine Streets. Such a conventional lift station is shown in FIG. 6 as including a manhole 72 into which the pipeline 73 discharges to atmosphere. The sewage within the manhole 72 is pumped through a force main 75 by a pumping device 76 which may be, for example, a conventional Smith & Loveless Monoject Pneumatic Sewage Ejector manufactured by the above mentioned Smith & Loveless, Inc. Unlike a conventional lift station arrangement, the force main 75 of the lift station 71 discharges into a pressure line rather than to gravity, this pressure line being the pipeline 31.

It should be noted that the illustrated pipeline system of FIG. 1 is laid in the form of a grid or network. Thus, the pipelines 33 and 77 are connected by three pipelines 78, 79 and 80. Assume, for example, that the pipeline 77 becomes obstructed at the point 81 so that no further flow can occur. The pressure device 40 associated with each of the houses on Lincoln Road to the right of the break 81 (FIG. 1) and on "B" and "C" Streets between 4th and 6th Streets will pump the sewage through the pipelines 79 and 80 into the pipeline 33, thence to pipelines 78 and 25, thus redirecting the flow of sewage so that all houses and other buildings still have a means of getting rid of their sewage even though the pipeline 77 is obstructed at 81. Similarly, it can be appreciated that the above mentioned houses 10 located on 6th St. to the right of the point 81 will be able to dispose of their sewage through the pipeline 77 and the pipelines 82, 73 and 75 depending on the amount entering the various lines.

Figure 4:
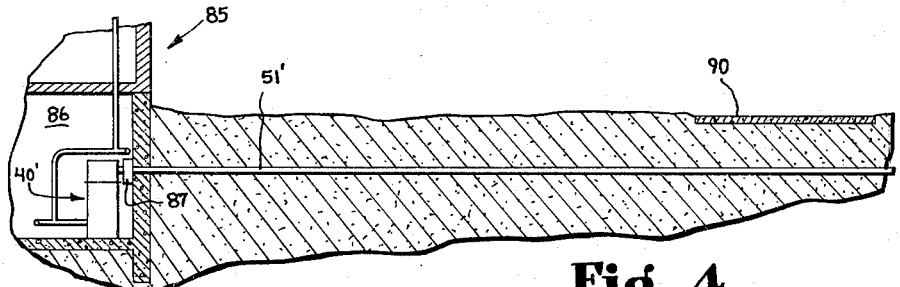
FIG. 4 is a view similar to FIG. 2 of an alternative embodiment of the invention.

A further feature of the present invention is shown in FIG. 4 which illustrates an alternative embodiment as compared to FIG. 2. In FIG. 4, the house 85 has a basement 86 within which is received a pumping device 40'. Just downstream of the pumping device 40' and secured to the discharge pipe 51' is a heating device 87. It will be noted that the discharge pipeline 51' extends beneath the sidewalk or street 90. The heating device 87 which may be of any conventional type, heats the sewage within the pipe 51' to a sufficient extent to melt any snow which may be on the sidewalk 90.

From the above description, it will be obvious that the present invention provides a novel sewerage system and method of disposing of sewage which substantially reduces the cost of constructing a sewerage system and otherwise meets the above listed objects of the invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A sewerage system comprising a plurality of sewage sources, a sewage disposal location, a pump at each of said sewage sources, a group of closed-to-atmosphere interconnected pipelines leading from said sources to said location and having a plurality of inlet ends, each of said inlet ends being coupled to a respective one of said pumps, said group also having an output end at said sewage disposal location, said pumps each incorporating check valve means arranged to block flow of sewage out of the inlet ends of said group, said pumps being operable to pump sewage from said sewage sources into said group through said inlet ends and to thereby place the sewage within said group under pressure, said pumps being controlled independently of one another to pump sewage without regard to whether or not others of said pumps are pumping sewage.

2. A sewerage system comprising a plurality of sewage sources, a sewage disposal location, a pump at each of said sewage sources, a group of closed-to-atmosphere interconnected pipelines leading from said sources to said location and having a plurality of inlet ends, each of said inlet ends being coupled to a respective one of said pumps, said group also having an outlet end at said sewage disposal location, said pumps each incorporating check valve means arranged to block flow of sewage out of the inlet ends of said group, said pumps being operable to pump sewage from said sewage sources into said group through said inlet ends and to thereby place the sewage within said group under pressure, said pumps being controlled independently of one another to pump sewage without regard to whether or not others of said pumps are pumping sewage, said pipelines being laterally directed without regard to ground slope and having portions which are level and portions which lead uphill.

3. A sewerage system comprising a plurality of sewage sources, a sewage disposal location, a pump at each of said sewage sources, a group of closed-to-atmosphere pipelines leading from said sources to said location and having a plurality of inlet ends, each of said inlet ends being coupled to a respective one of said pumps, said group also having an outlet end at said sewage disposal location, said pumps each incorporating check valve means arranged to block flow of sewage out of the inlet ends of said group, said pumps being operable to pump sewage from said sewage sources into said group through said inlet ends and to thereby place the sewage within said group under pressure, said pumps being controlled independently of one another to pump sewage without regard to whether or not others of said pumps are pumping sewage, said group of pipelines being in a grid whereby obstruction of certain of said pipelines does not block flow from any of said sources to said location but instead causes redistribution of flow.

4. A sewerage system comprising a plurality of sewage sources, a sewage disposal location, a pump at each of said sewage sources, a group of closed-to-atmosphere pipelines leading from said sources to said location and having a plurality of inlet ends, each of said inlet ends being coupled to a respective one of said pumps, said group also having an outlet end at said sewage disposal location, said pumps each incorporating check valve means arranged to block flow of sewage out of the inlet ends of said group, said pumps being operable to pump sewage from said sewage sources into said group through said inlet ends and to thereby place the sewage within said group under pressure, said pumps being controlled independently of one another to pump sewage without regard to whether or not others of said pumps are pumping sewage, said pipelines being laterally directed without regard to ground slope and having portions which are level and portions which lead uphill, said group of pipelines being in a grid whereby obstruction of certain of said pipelines does not block flow from any of said sources to said location but instead causes redistribution of flow.

5. A sewerage system comprising a plurality of sewage sources, a sewage disposal location, a pump at each of said sewage sources, a group of closed-to-atmosphere pipelines leading from said sources to said location, said group including a plurality of branches and a trunk with said branches leading into said trunk, said branches having a plurality of inlet ends, each of said inlet ends being coupled to a respective one of said pumps, said trunk having an outlet end at said sewage disposal location, said pumps each incorporating check valve means arranged to block flow of sewage out of the inlet ends of said branches, said pumps being operable to pump sewage from said sewage sources into said group through said inlet ends and to thereby place the sewage within said group under pressure, said pumps being controlled independently of one another to pump sewage without regard to whether or not others of said pumps are pumping sewage, said pipelines being laterally directed without regard to ground slope and having portions which lead uphill, said group of pipelines being in a grid whereby obstruction of certain of said pipelines does not block flow from any of said sources to said location but instead causes redistribution of flow.

References Cited by the Examiner

UNITED STATES PATENTS

| | | | |
|---|---|---|---|
| 235,910 | 12/80 | Shone | 103—246 |
| 482,439 | 9/92 | Liernur | 137—236 |

OTHER REFERENCES

American Sewerage Practice, vol. I, Design of Sewers, 2nd edition, Metcalf and Eddy, 1928, McGraw-Hill, N.Y., pp. 34–63.

Sewerage and Sewage Treatment, Babbitt, 6th edition, 1947, John Wiley & Sons, N.Y., pp. 81–94.

MORRIS O. WOLK, *Primary Examiner*.